(12) United States Patent
Renforth et al.

(10) Patent No.: US 9,516,861 B2
(45) Date of Patent: Dec. 13, 2016

(54) LIGHTED FLEA COMB

(71) Applicant: Doskocil Manufacturing Company, Inc., Arlington, TX (US)

(72) Inventors: Jack William Renforth, Azle, TX (US); Ann Hanson, Ionia, MI (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 286 days.

(21) Appl. No.: 13/927,365

(22) Filed: Jun. 26, 2013

(65) Prior Publication Data

US 2013/0343041 A1    Dec. 26, 2013

Related U.S. Application Data

(60) Provisional application No. 61/664,429, filed on Jun. 26, 2012.

(51) Int. Cl.
| | |
|---|---|
| *B26B 19/46* | (2006.01) |
| *A01K 13/00* | (2006.01) |
| *A46B 7/02* | (2006.01) |

(52) U.S. Cl.
CPC ............ *A01K 13/002* (2013.01); *A46B 7/023* (2013.01)

(58) Field of Classification Search
CPC . A46B 15/00; A46B 15/0055; A46B 15/0095; A46B 5/0095; A46B 7/04; A46B 2200/1093; A46B 2200/104; A46B 7/023; B26B 21/46; B26B 13/24; A45D 24/10

USPC ........ 362/109, 115; 119/600, 611, 613, 625, 119/626, 627, 664
See application file for complete search history.

(56) References Cited

U.S. PATENT DOCUMENTS

| | | | | |
|---|---|---|---|---|
| 3,927,684 | A | * | 12/1975 | Lam ........................ 132/119.1 |
| 4,226,251 | A | * | 10/1980 | Wall ............................ 132/212 |
| 4,527,576 | A | | 7/1985 | Chou |
| 4,936,259 | A | * | 6/1990 | Owen et al. ................. 119/627 |
| 2012/0051085 | A1 | | 3/2012 | Albaladejo Jimenez |

FOREIGN PATENT DOCUMENTS

| | | |
|---|---|---|
| CA | 422776 | 9/1944 |
| GB | 2214804 A | 9/1989 |
| WO | 2010/045973 A1 | 4/2010 |

* cited by examiner

*Primary Examiner* — Andrew Coughlin
*Assistant Examiner* — Meghan Ulanday
(74) *Attorney, Agent, or Firm* — Global IP Counselors, LLP

(57) ABSTRACT

An improved flea comb apparatus can be used to remove fleas from animals such as cats, dogs, and the like and advantageously includes a retractable flea comb and lights that are automatically illuminated when the flea comb is in a deployed condition. The lights attract fleas and aid in their removal by providing an intensity of light at the undercoat region of an animal that has not previously been conveniently provided. The lights also assist the user in identifying fleas during combing of the animal.

12 Claims, 7 Drawing Sheets

LIGHTED FLEA COMB

CROSS-REFERENCE TO RELATED APPLICATION

The instant application claims priority from U.S. Provisional Patent Application Ser. No. 61/664,429 filed Jun. 26, 2012, the disclosures of which are incorporated herein by reference.

BACKGROUND

1. Field

The disclosed and claimed concept relates generally to pet care products and, more particularly, to a lighted flea comb.

2. Related Art

Pet such as cats, dogs, and other domestic animals can suffer from numerous undesirable physical conditions, including diseases, parasites, and the like. One typical type of parasitic condition that occurs is an infestation of the animal's fur with fleas. As is generally understood in the relevant art, fleas are tiny insects which, during such an infestation, undesirably live in an animal's undercoat and bite the animal, causing discomfort. The animal can ingest the fleas while scratching and licking of such a bite, with the result that flea larvae can undesirably grow in the animal's digestive tract.

To combat such flea infestations, pet owners have employed specially configured combs with closely spaced teeth or tines which, when used to comb the fur of an infested animal, can separate the fleas from the fur for disposal. While such previously-known flea combs have been generally effective for their intended purposes, they have not been without limitation.

For instance, such combing can be tedious and can require significant effort depending upon the size of the animal being treated. Previously-known flea combs have not been ergonomically designed, whereby extended combing can cause fatigue in the user. Additionally, such combing can still leave fleas behind in the fur if the user is not diligent in combing every part of the animal, potentially more than once depending upon the thickness of the fur and the fashion in which the comb is applied. Most typically, the user of a conventional flea comb continues to comb the pet until no more fleas are removed, which can take quite some time. It thus would be desirable to provide an improved tool for the removal of fleas from an animal.

SUMMARY

An improved flea comb apparatus can be used to remove fleas from animals such as cats, dogs, and the like and advantageously includes a retractable flea comb and lights that are automatically illuminated when the flea comb is in a deployed condition. The lights attract fleas and aid in their removal by providing an intensity of light at the undercoat region of an animal that has not previously been conveniently provided. The lights also assist the user in identifying fleas during combing of the animal.

Accordingly, an aspect of the disclosed and claimed concept is to provide an improved flea comb apparatus that enables improved removal of fleas from animals.

Another aspect of the disclosed and claimed concept is to provide an improved flea comb apparatus that is ergonomically configured to avoid fatigue in the user.

Another aspect of the disclosed and claimed concept is to provide an improved flea comb apparatus that improves visualization of fleas in an animal's fur by providing lighting that provides illumination generally at the location where the flea comb engages the fur.

Another aspect of the disclosed and claimed concept is to provide an improved flea comb apparatus that employs illumination to attract fleas out of an animal's undercoat.

Another aspect of the disclosed and claimed concept is to provide an improved flea comb apparatus having a retractable flea comb and having an illumination system that is energized when the flea comb is deployed but is deenergized when the flea comb is retracted.

Accordingly, as aspect of the disclosed and claimed concept is to provide an improved flea comb apparatus, the general nature of which can be stated as including a support assembly and a comb assembly. The support assembly can be stated as including a housing and an illumination system, with the housing having an interior region, and with the illumination system being switchable between an energized condition and a deenergized condition. The comb assembly can be stated as including a flea comb, with the comb assembly being disposed on the support assembly and being movable between a first position and a second position. In the first position at least a portion of the flea comb is retracted into the interior region, and in the second position at least a portion of the flea comb protrudes from the housing. At least a portion of the illumination system is situated on at least one of the housing and the flea comb.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
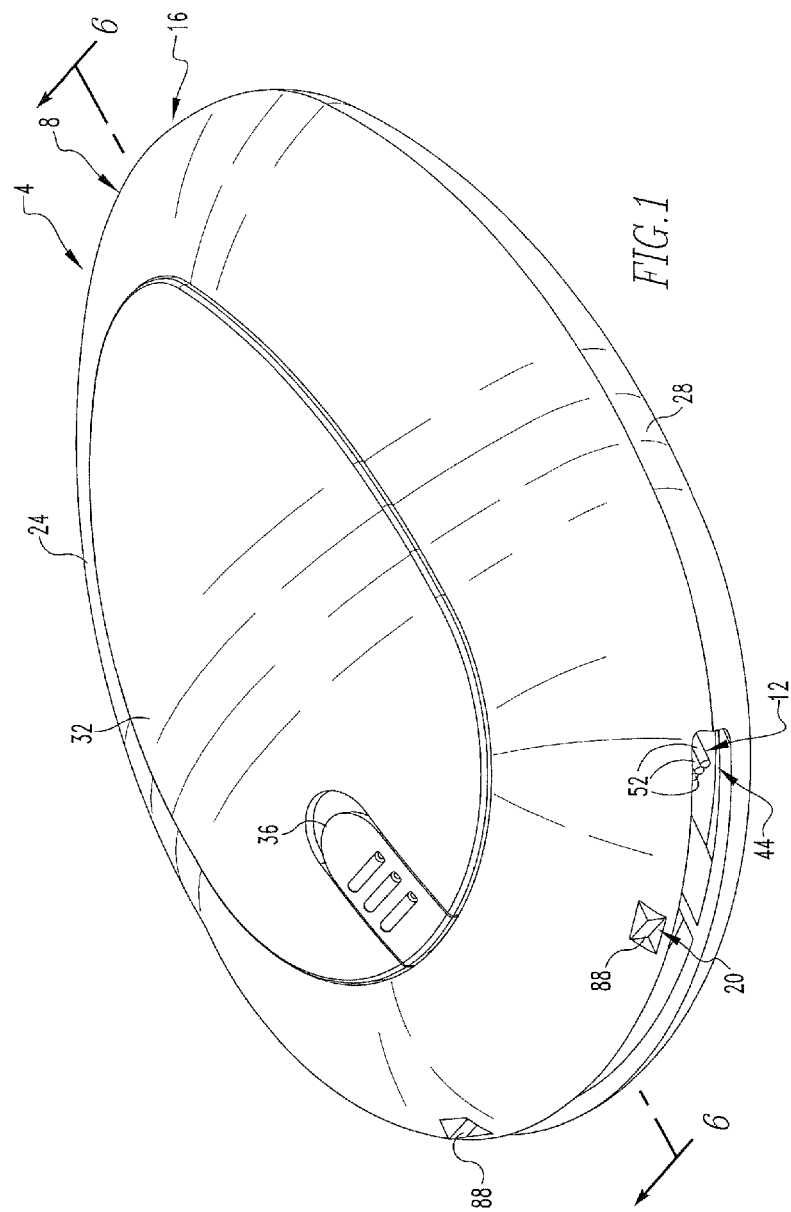
FIG. 1 is a perspective view of an improved flea comb apparatus in accordance with the disclosed and claimed concept having a comb assembly that is in a retracted position and having an illumination system that is deenergized.
Figure 2:
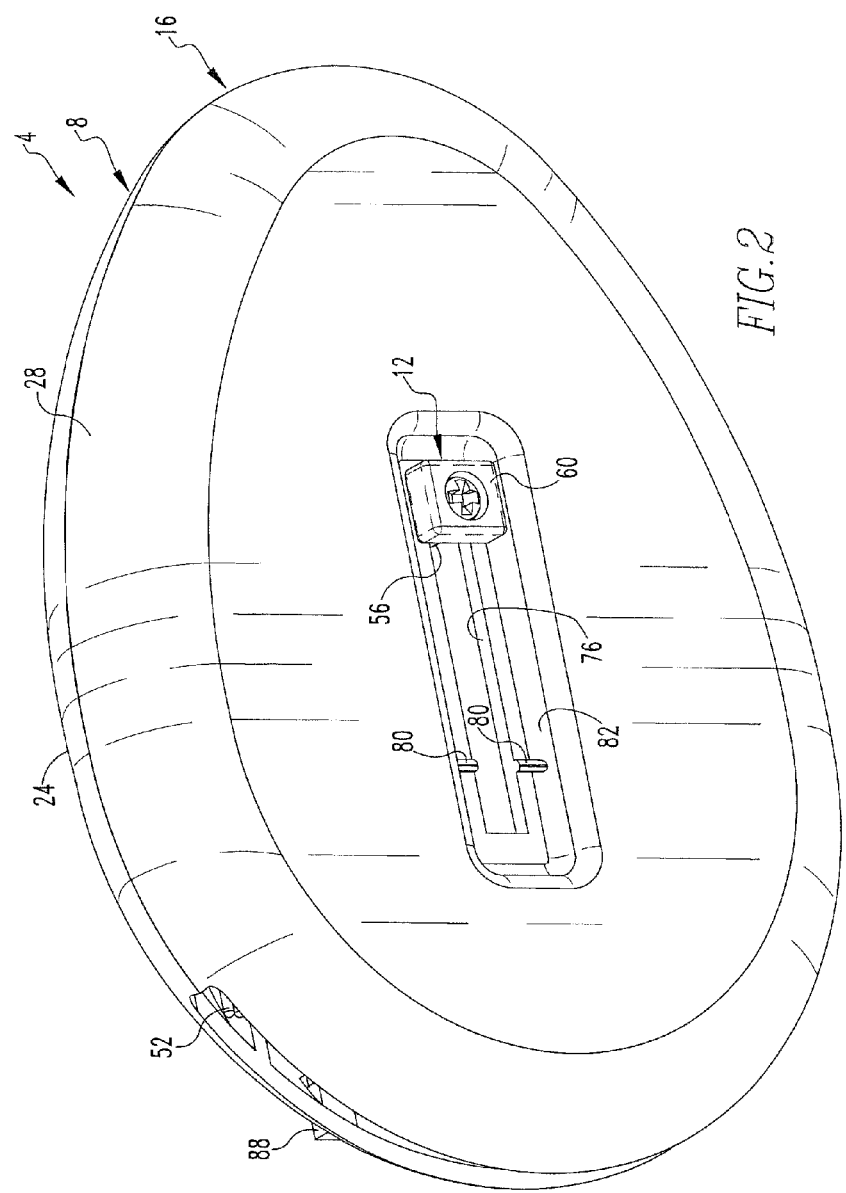
FIG. 2 is another perspective view of the flea comb apparatus of FIG. 1.
Figure 3:
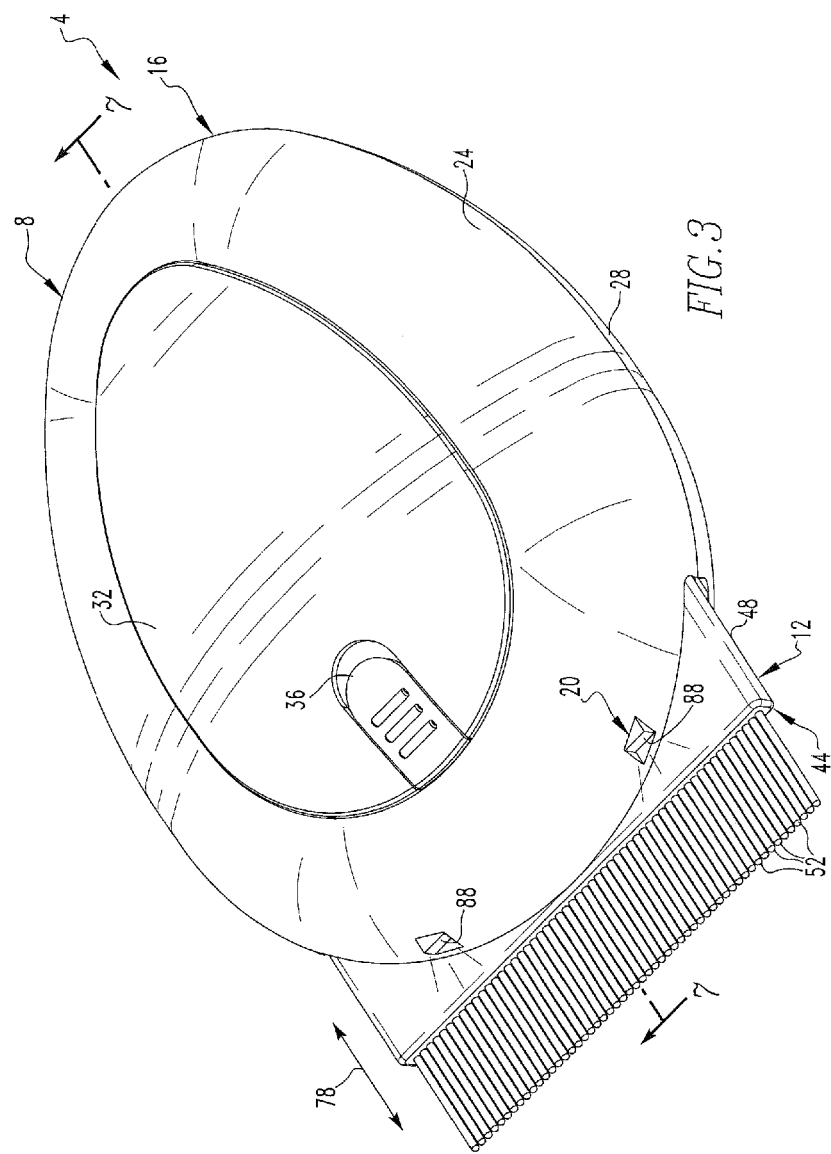
FIG. 3 is a view similar to FIG. 1, except depicting the comb apparatus in a deployed position and depicting the illumination system as being energized.

An improved flea comb apparatus 4 in accordance with the disclosed and claimed concept is depicted in FIGS. 1-3 and is depicted in part in FIGS. 4-7. The flea comb apparatus 4 can be said to include a support assembly 8 and a comb assembly 12. The support assembly 8 can be said to include a housing 16 and an illumination system 20, with the illumination system 20 being disposed upon the housing 16.

The housing 16 is shaped to have an arcuate exterior configuration which is similar to that of a computer mouse and which can easily be grasped in the palm and held in place by the fingers (including the thumb). The arcuate exterior surface of the depicted exemplary housing 16 includes curves of varying radius to give the housing 16 a complex visual appearance.

The arcuate exterior of the housing 16 additionally improves the ergonomic properties of the comb apparatus 4 by making the housing 16 relatively easy to grasp by a user for extended periods of time. The curved shape of the exterior surface of the housing 16 fits comfortably into the palm and fingers of the user's hand, thus requiring minimal grasping force from the user to hold the flea comb apparatus 4 and thus reducing fatigue and pain the user during period of prolonged use.

The housing 16 can be said to include a first portion 24 and a second portion 28 that are connectable together. The housing 16 further includes a battery cover 32 that includes a button 36 and that is removably disposed on the first portion 24. As will set forth in further detail below, the battery cover 32 provides access to a battery 84 of the illumination system 20. When the first and second portions 24 and 28 are connected together, the housing 16 can be said to include an interior region 40 (FIGS. 4-7) that is disposed generally between the first and second portions 24 and 28.

Figure 4:
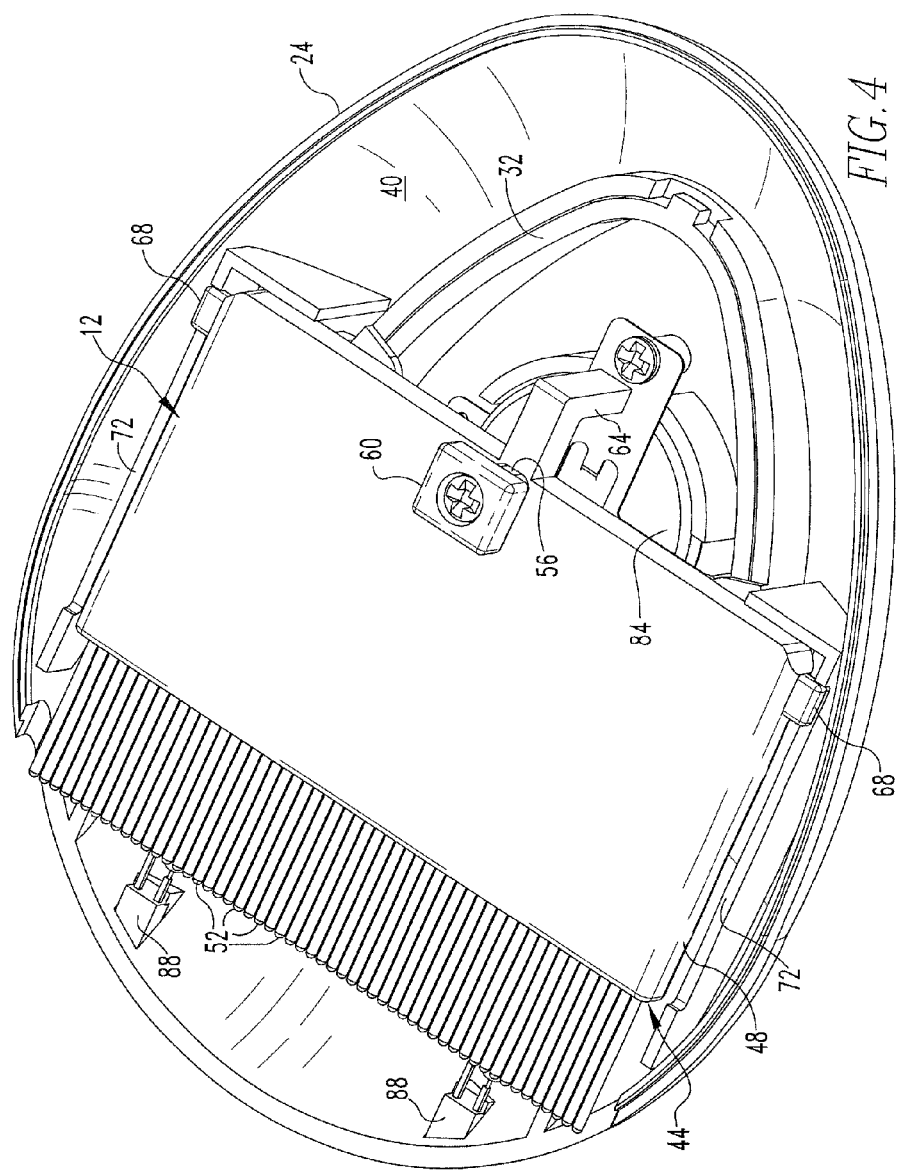
FIG. 4 is a fractional view of the flea comb apparatus of FIG. 1.
Figure 5:
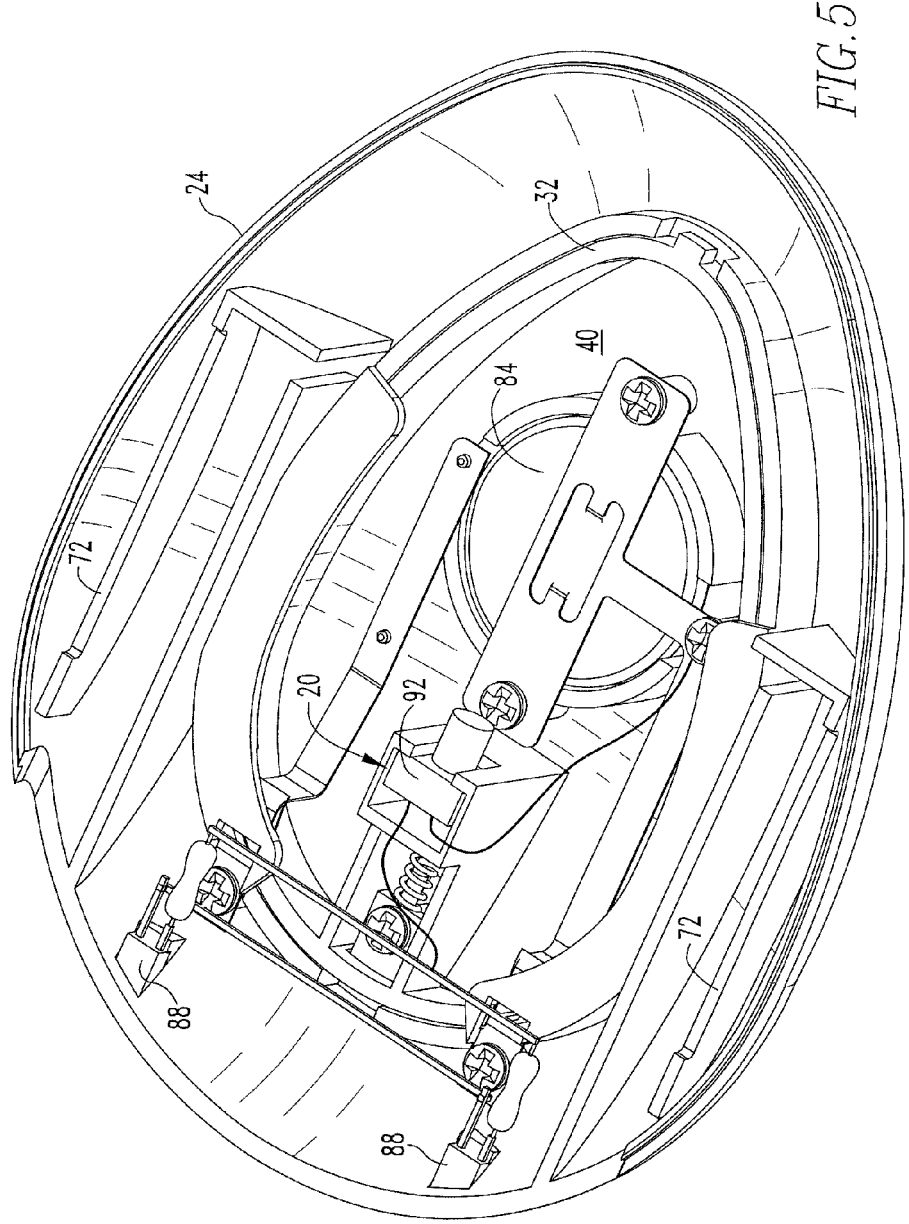
FIG. 5 is another fractional view of the flea comb apparatus of FIG. 1.
Figure 6:
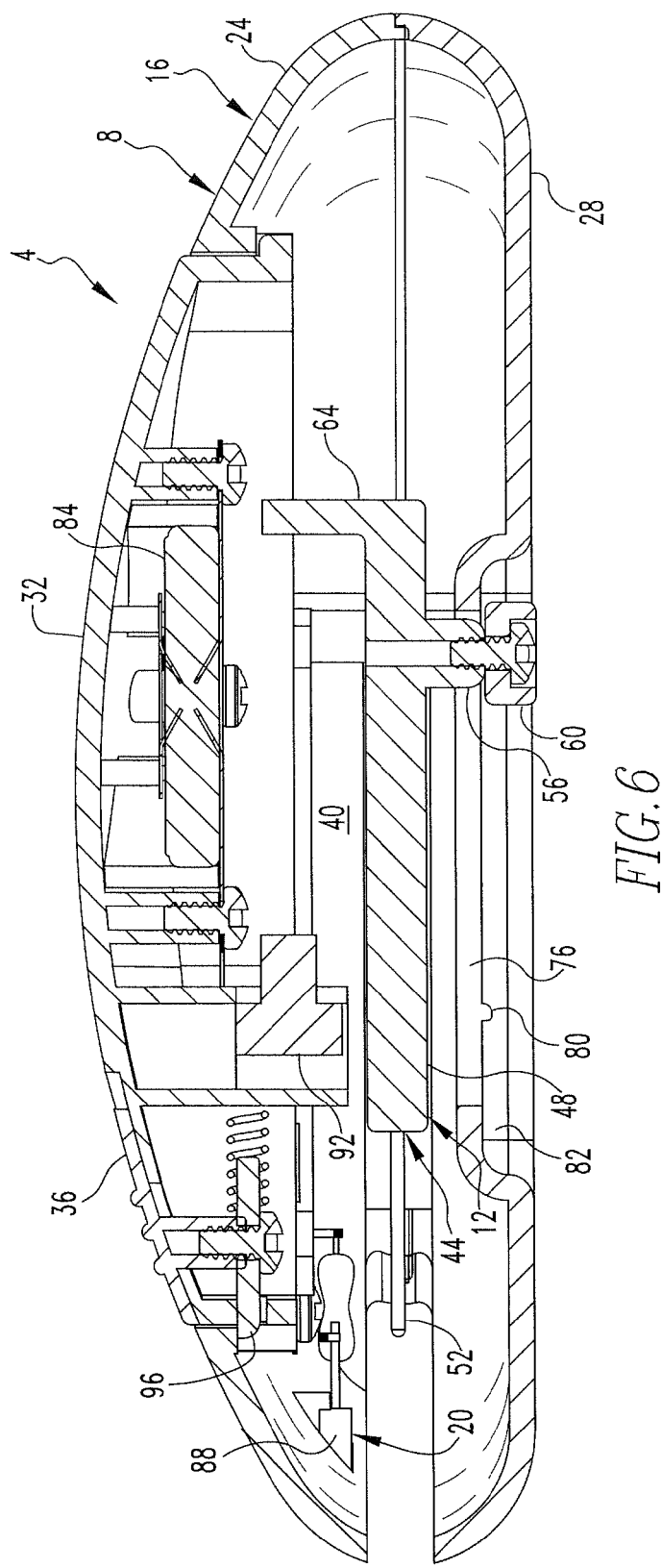
FIG. 6 is a sectional view as taken along line 6-6 of FIG. 1.
Figure 7:
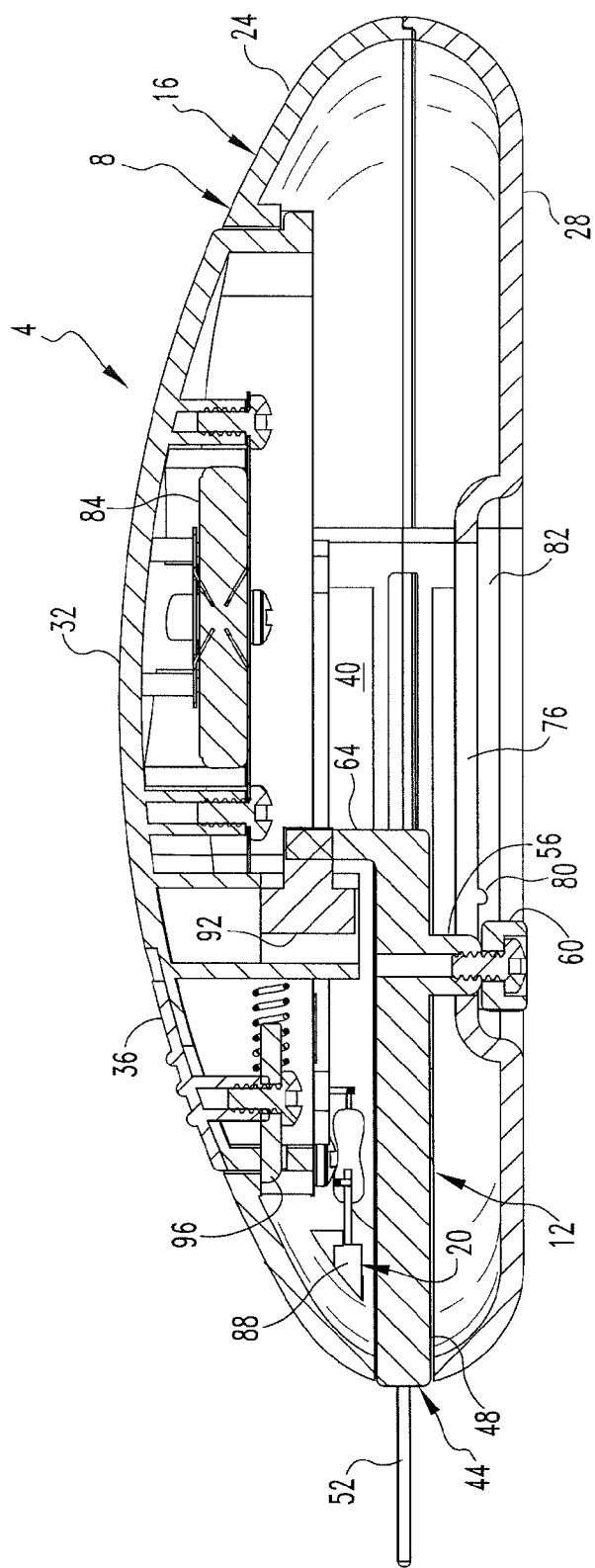
FIG. 7 is a sectional view as taken along line 7-7 of FIG. 3.

The comb assembly 12 can be said to include a flea comb 44 that includes a base 48 (FIGS. 3-4 and 6-7) and a plurality of teeth 52 that protrude from the base 48. The teeth 52 are aligned with one another and are slightly spaced apart from one another in a known fashion that permits the combing of an animal's fur, and particularly the combing of the undercoat thereof, in a fashion that will isolate and enable the removal of fleas. The comb assembly 12 further includes a lug 56 (FIGS. 2, 6, and 7) that protrudes from the base 48 and a handle 60 (FIG. 2) which is mountable to the lug 56 and that is situated generally at the exterior of the housing 16. The comb assembly 12 additionally includes an actuation element 64 (FIGS. 4, 6, and 7). As will be set forth in greater detail below, the actuation element 64 is operatively engageable with a switch 92 of the illumination system 20. The comb assembly 12 also includes a plurality of alignment elements 68 (FIG. 4) that are situated on the base 48 and which are slidably disposed on a pair of parallel and spaced apart rails 72 that are co-formed with or otherwise disposed on the first portion 24.

The second portion 28 has an elongated slot 76 (FIG. 2) that is formed in an elongated depression 82 which is formed on the second portion 28. The slot 76 extends between the interior region 40 and the exterior of the housing 16. The lug 56 extends through slot 76 in both the retracted and deployed positions of the comb assembly 12, and the lug 56 is slidable along slot 76. The handle 60 is advantageously recessed in the depression 82 in the retracted and deployed positions. That is, the handle 60 being recessed in the depression 82 in the deployed position enhances the ergonomics of the flea comb apparatus 4 by avoiding interference with the user's hand during use. The handle 60 being recessed in the depression 82 in the retracted position enhances the form factor and reliability of the flea comb apparatus 4 by avoiding having the handle 60 protrude from the housing 16 and thereby avoiding the handle 60 from unintentionally engaging other structures or becoming broken or lost during periods of nonuse.

With the handle 60 mounted to the lug 56, a portion of the second portion 28 is retained between the handle 60 and the base 48 to retain the flea comb 44 slidably disposed on the second portion 28. Such retention also permits the flea comb 44 to be translated along a direction of movement 78 (FIG. 3) between a retracted position, such as is depicted generally in FIGS. 1-2, 4, and 6, and a deployed position such as is depicted generally in FIGS. 3 and 7. The direction of movement 78 is parallel with the longitudinal extent of the slot 76. The second portion 28 further has a pair of retention elements 80 (FIGS. 2 and 6-7) formed thereon that are frictionally engageable with the handle 60 and that serve as retention elements to retain the flea comb 44 in the deployed position during use.

The illumination system 20 can be said to include the aforementioned battery 84 which serves as a power source, a number of LEDs 88 which serve as light sources, and the aforementioned switch 92. As employed herein, the expression "a number of" and variations thereof shall refer broadly to any nonzero quantity, including a quantity of one. In the depicted exemplary embodiment, the illumination system 20 includes a pair of the LEDs 88, and it is understood that the LEDs 88 could be replaced with other sources of electromagnetic radiation such as incandescent or fluorescent light bulbs, ultraviolet emitters, fiber optic elements, and the like without limitation. The switch 92 is operable to switch the illumination system 20 between an OFF condition in which the LEDs 88 are deenergized and an ON condition in which the LEDs 88 are energized, i.e., illuminated. Advantageously, when the flea comb 44 is in its retraced position wherein the teeth 52 are retraced into the housing 16, the actuation element 64 is disengaged from the switch 92, which causes the illumination system 20 to be in its OFF condition. However, when the flea comb 44 is translated to its deployed position wherein the teeth 52 protrude from the housing 16, the actuation element 64 that is disposed on the base 48 is engaged with the switch 92, which causes the illumination system 20 to be switched to its ON condition and to energize the LEDs 88.

The LEDs 88 are oriented such that when they are energized and thus illuminated, they shine and provide illumination in a direction generally along the direction of movement 78 away from the housing 16. As mentioned above, the direction of movement 78 corresponds with the direction in which the teeth 52 extend away from the base 48 when the flea comb 44 is in its deployed position. Such orientation of the LEDs 88 generally along the direction of movement 78 may include a slight angling of the beams toward one another so that the beams at least partially converge at a central region of the free end of the flea comb 44.

The flea comb 44 is moved from its deployed position toward its retraced position by translating the handle 60 across the retention elements 80 and sliding the lug 56 within the slot 76. During such movement, the alignment elements 68 are caused to slide along the rails 72, and a relatively greater portion of the flea comb 44 is received in the interior region 40. This places the flea comb 44 in its retracted position. Along with such translation of the flea comb 44 to its retracted position, the actuation element 64 becomes disengaged from the switch 92 which causes the illumination system 20 to be returned to its OFF condition.

In the depicted exemplary embodiment, the flea comb 44 in the retracted position is situated in its entirety within the interior region 44. In the deployed position of the depicted exemplary embodiment, the teeth 52 are situated in their entirety at the exterior of the housing 16, i.e., outside the interior region 44, and a portion of the base 48 protrudes from the housing 16 and is situated at the exterior thereof.

With continued usage, the battery 84 may eventually become exhausted, and the button 36 on the battery cover 32 can be translated to remove a tab 96 (FIGS. 6-7) from engagement with the first portion 24, which permits the battery cover 32 to be removed from first portion 24. The battery 84 can then be replaced, as needed, and the battery cover 32 replaced, which permits the illumination system 20 to be again operated in the fashion set forth above.

The arrangement of the illumination system 20 with its LEDs 88 advantageously allows the user to use the LEDs 88 to identify fleas and remove them from the animal during grooming The LEDs 88 direct at the undercoat of the animal light that has not previously been conveniently provided and which facilitates identification and removal of fleas. Moreover, the intensity of the LEDs 88 can attract fleas by providing at the undercoat of the animal a level of illumination that typically does not exist at the undercoat. That is, the brilliance of the LEDs 88 can attract fleas thereto, which helps in the removal of the fleas from the animal. Additionally, the switch 92 of the illumination system 20 advantageously coordinates illumination of the LEDs 88 with the deployed position of the flea comb apparatus 4 whereas the LEDs 88 in the retracted position are deenergized. This saves effort on the part of the user and simplifies use of the flea comb apparatus 4. Furthermore, the flea comb apparatus 4 provides light adjacent the flea comb 44, which enables illumination of the undercoat and the removal of fleas from the undercoat to be performed with only a single hand of the user, thus freeing the other hand to hold the animal Other advantages will be apparent to one of ordinary skill in the relevant art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A flea comb apparatus comprising:
   a support assembly including a housing and an illumination system, the housing including an interior region, the illumination system including a plurality of light sources and being switchable between an energized condition and a deenergized condition;
   a comb assembly disposed on the support assembly and including a flea comb and an operating member, the operating member being configured to translate the comb assembly along a direction of movement between a first position and a second position, the first position being a position in which at least a portion of the flea comb is retracted into the interior region, the second position being a position in which at least a portion of the flea comb protrudes from the housing, the operating member being further configured to operably switch the plurality of light sources between the energized and deenergized conditions,
   at least a portion of the illumination system being situated on at least one of the housing and the flea comb, and the plurality of light sources being oriented to shine generally along the direction of movement of the comb assembly and away from the housing.

2. The flea comb apparatus of claim 1 wherein
   the flea comb includes a base and a plurality of teeth extending generally away from the base, the plurality of light sources being oriented to shine generally in the direction in which the teeth extend away from the base.

3. The flea comb apparatus of claim 2 wherein
   the teeth extend away from the base of the flea comb in a direction along the direction of movement.

4. The flea comb apparatus of claim 1 wherein
   at least one of the support assembly and the comb assembly includes at least one first retention element configured to bias movement of the comb assembly away from the second position.

5. The flea comb apparatus of claim 4 wherein
   the operating member is a handle configured to be engaged by a user to translate the comb assembly between the first and second positions, the housing further includes the first retention element,
   the first retention element being engageable with the handle to bias movement of the comb assembly toward the first position.

6. The flea comb apparatus of claim 1 wherein
   the comb assembly includes a movable portion extending between the flea comb and the exterior of the housing in both the first and second positions of the comb assembly, the movable portion being configured to be engaged by a user to move the comb assembly between the first and second positions.

7. A flea comb apparatus comprising:
   a support assembly that comprises a housing and an illumination system, the housing having an interior region, the illumination system being switchable between an energized condition and a deenergized condition;
   a comb assembly that comprises a flea comb, the comb assembly being disposed on the support assembly and being movable between a first position and a second position, in the first position at least a portion of the flea comb being retracted into the interior region, in the second position at least a portion of the flea comb protruding from the housing, the first and second positions corresponding to the deenergized condition and the energized condition, respectively;
   at least a portion of the illumination system being situated on at least one of the housing and the flea comb;
   in the first position of the comb assembly the illumination system is in the deenergized condition; and
   in the second position of the comb assembly the illumination system is in the energized condition.

8. The flea comb apparatus of claim 7 wherein
   the illumination system comprises a number of light sources, a power source, and a switch that is operable to switch the illumination system between the energized and deenergized conditions.

9. The flea comb apparatus of claim 8 wherein
   the comb assembly and the switch are disengaged in the first position; and
   the comb assembly and the switch are engaged in the second position. the first retention element being engageable with the handle to bias movement of the comb assembly toward the first position.

10. The flea comb apparatus of claim 7 wherein
    the flea comb is movable between the first and second positions to switch the illumination system between the energized and deenergized conditions.

11. A flea comb apparatus comprising:
    a support assembly that comprises a housing and an illumination system, the housing having an interior region, the illumination system being switchable between an energized condition and a deenergized condition;
    a comb assembly that comprises a flea comb, the comb assembly being disposed on the support assembly and being movable between a first position and a second position, in the first position at least a portion of the flea comb being retracted into the interior region, in the second position at least a portion of the flea comb protruding from the housing;

at least a portion of the illumination system being situated on at least one of the housing and the flea comb;

wherein a portion of the comb assembly extends between the flea comb and the exterior of the housing in both the first and second positions of the comb assembly, the portion of the comb assembly being structured to be engageable by a user to move the comb assembly between the first and second positions; and wherein the housing has an elongated slot formed therein that extends between the interior region and the exterior of the housing, and wherein the portion of the comb assembly extends through the slot and is movable along the slot to move the comb assembly between the first and second positions.

12. The flea comb apparatus of claim 11 wherein the portion of the comb assembly comprises a handle that is structured to be engageable by a user to translate the comb assembly between the first and second positions, and wherein the housing has an elongated depression formed therein within which the slot is formed, the handle being recessed within the depression in the first and second positions.

* * * * *